C. W. PRATT.
POWER HAND-DRILL STOCK.
No. 182,224. Patented Sept. 12, 1876.
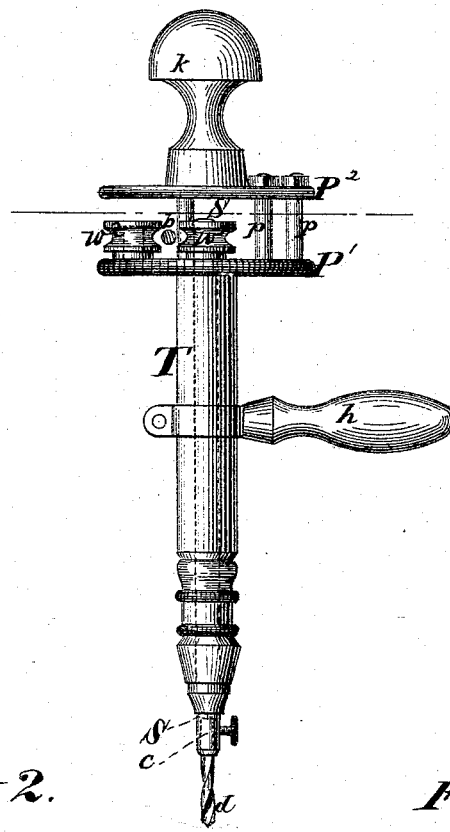
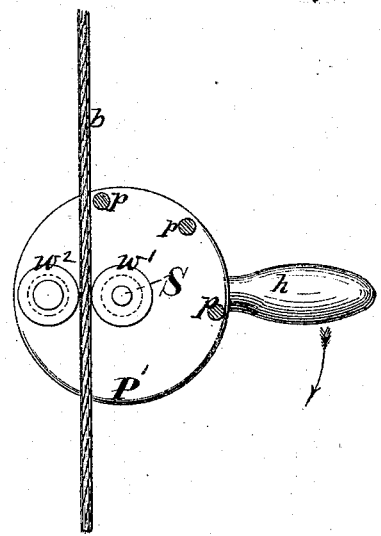
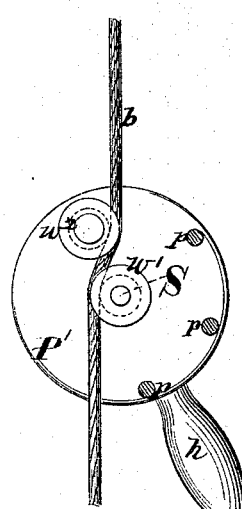

UNITED STATES PATENT OFFICE.

CHARLES W. PRATT, OF DEEP RIVER, CONNECTICUT, ASSIGNOR TO PRATT, READ & CO., OF SAME PLACE.

IMPROVEMENT IN POWER HAND-DRILL STOCKS.

Specification forming part of Letters Patent No. 182,224, dated September 12, 1876; application filed March 6, 1876.

*To all whom it may concern:*

Be it known that I, CHARLES W. PRATT, of Deep River, in the county of Middlesex and State of Connecticut, have invented a new and useful Improvement in Power Hand-Drill Stocks; and I do hereby declare that the following is a full, clear, and exact description of the same, reference being had to the accompanying drawing, which forms a part of this specification.

The object of my invention is to provide a substitute for the fiddle bow-drill, and it is primarily designed for use in the manufacture of piano, melodeon, and organ keys, and similar keys of other instruments; but it has useful applications in many other mechanical operations.

The invention consists in a drill-stock, in which the drill-spindle, chuck, and drill are driven by an endless band running on suitable stationary pulleys, and which comprises means for readily engaging the band with, or disengaging it from, the pulley on the drill-spindle, the operator using for that purpose only the single hand which takes up and places the drill-stock in the position where it is desired to operate, and, with that hand only, carrying the drill-stock to any position on the bench or table which supports the article to be drilled without disengaging the pulley in the drill-spindle from the endless band, and, also, with that hand only, causing an idler-pulley to tighten and press the same upon the pulley on the drill-spindle, in order to produce the necessary friction between the band and pulley on the drill-spindle.

Figure 1 in the accompanying drawing represents a side view of my improved power hand-drill stock. Figs. 2 and 3, respectively, represent portions of the stock viewed from above.

S is the drill-spindle, which plays in a tubular portion, T, of the stock, which tubular portion forms a bearing for the spindle S. To the top of said tubular portion T is attached a plate, $P^1$, preferably of circular form. Rising from the said plate $P^1$, upon one side thereof, are one or more pillars, $p$, which support another plate, $P^2$, placed preferably parallel to the plate $P^1$, at a distance from the said plate $P^1$ sufficient to allow the passage of the band $b$ between the pulleys $w^1$ and $w^2$ and the plate $P^2$. The pillars $p$ may be secured to the plates $P^1$ $P^2$ either by riveting or by screw threads and nuts. To the upper side of the plate $P^2$ is attached a knob or handle, $k$.

Instead of making the plates $P^1$ and $P^2$ of separate pieces, and joining them by a pillar or pillars, $p$, both the plates and the part that joins and supports them in proper relation with each other may be made of a single piece.

On the top of the spindle S is fastened the pulley $w^1$, which drives the said spindle. At a short distance from the pulley $w^1$ is mounted upon the plate $P^1$ the idler-pulley $w^2$. The drill $d$ is held in a chuck, $c$, of any approved form. To the tubular bearing T of the stock, preferably at about the middle thereof, is fastened, by any approved method, and preferably at a right angle with the said tubular bearing, the handle $h$. The belt $b$ runs on stationary pulleys driven by any power, the said pulleys preferably running in bearings attached or having a fixed relation to the work bench or table which supports the articles to be drilled, and being preferably of that kind known as "drums," and extending the entire width of the bench or table, so that the endless band running on said pulleys or drums may be brought over any part of the said table or bench.

The drill-stock is used as follows: The operator takes hold of the handle $h$, and placing the open side of the head $P^1$ $p$ $P^2$ of the said drill-stock toward the endless band $b$, passes the said band through the space between the idler-pulley $w^2$ and the plate $P^2$, and thence down between the two pulleys $w^1$ and $w^2$, as shown in Fig. 2. He then turns the whole drill-stock on its longitudinal axis, so as to cramp the band $b$ between the two pulleys $w^1$ and $w^2$, as shown in Fig. 3.

The drill thus engaged by the said pulleys $w^1$ $w^2$, if the band $b$ is driven by drums extending the entire width of the table or workbench, may be carried to any part of said table or bench by the hand that grasps the handle $h$; and when a round band is used, the drill-stock may be used with great facility either in a vertical or inclined position.

When it is desired to hasten the operation of the drill, the pressure of the operator's hand not occupied with the handle $h$ may be applied to the knob $k$, which knob may also be used by the same hand to assist in maintaining the vertical or inclined position of the drill-stock.

I claim—

The combination of the open-sided head $P^1$ $p$ $P^2$, the tubular bearing T of the drill-spindle, the handle $h$, and the pulleys $w^1$ $w^2$, substantially as described, and for the purpose set forth.

CHAS. W. PRATT.

Witnesses:
GEO. A. READ,
FELIX A. DENISON.